March 8, 1960          H. LAHEE          2,927,806

PIPE COUPLING HAVING STRESS COMPENSATING MEANS

Filed Nov. 4, 1955          3 Sheets-Sheet 1

INVENTOR.
HENRY LAHEE

BY

ATTORNEYS

March 8, 1960          H. LAHEE          2,927,806

PIPE COUPLING HAVING STRESS COMPENSATING MEANS

Filed Nov. 4, 1955          3 Sheets-Sheet 2

INVENTOR.
HENRY LAHEE
BY
ATTORNEYS

March 8, 1960 H. LAHEE 2,927,806
PIPE COUPLING HAVING STRESS COMPENSATING MEANS
Filed Nov. 4, 1955 3 Sheets-Sheet 3

INVENTOR.
HENRY LAHEE
BY
ATTORNEYS

United States Patent Office 2,927,806
Patented Mar. 8, 1960

2,927,806

PIPE COUPLING HAVING STRESS COMPENSATING MEANS

Henry Lahee, Houston, Tex.

Application November 4, 1955, Serial No. 544,858

7 Claims. (Cl. 285—115)

This invention relates to a connection structure for joining members and, more particularly, to an arrangement for providing an improved threaded connection between members.

It is the primary object of the present invention to provide a threaded connection in which an elastic member is employed on each side of each threaded portion of the connection, one of the elastic members always being in tension and the other always being in compression, the elastic members providing for a storage of strain energy which is used to materially reduce the operating load fluctuations at the root sections of the threads at the connections.

It is a further object of the invention to provide a connection structure providing, for large variations of operating loads, a substantially constant sealing load pressure on a compression-deflection seal between adjacent sections of tubing.

It is a still further object of the invention to provide a connection structure providing, for large variations of operating loads, a substantially constant holding load pressure on the connection holding surfaces, whether these surfaces be thread faces or other holding surface forms.

These and other objects of the invention relating particularly to the construction thereof will become evident from the following description when read in conjunction with the accompanying drawings, in which.

Figure 1:
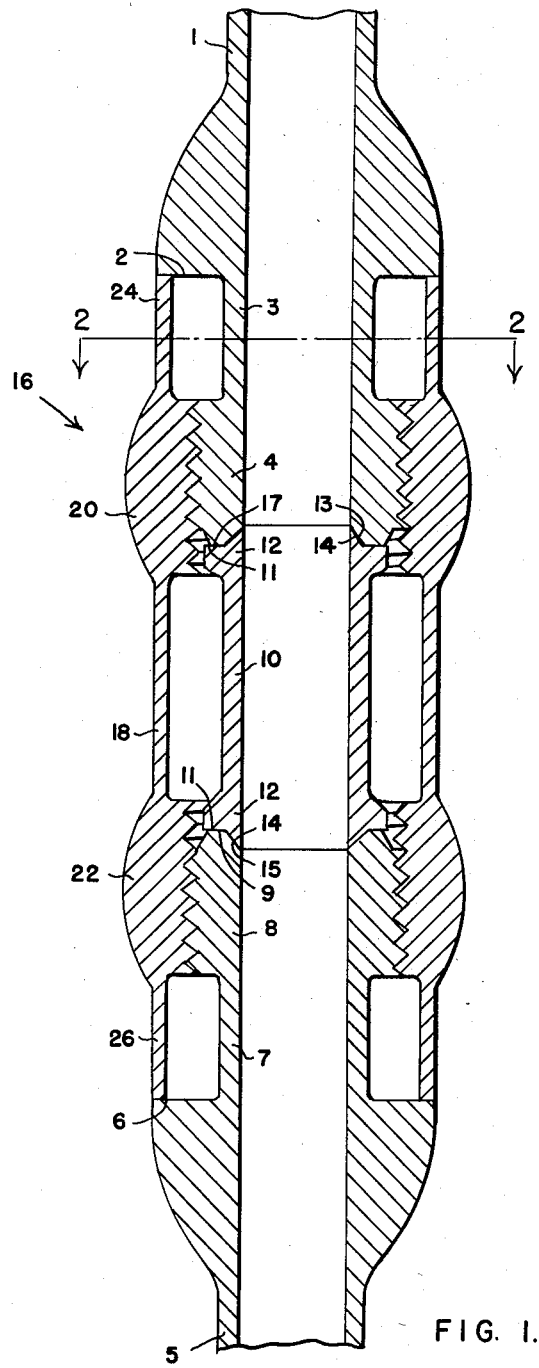
Figure 1 is a longitudinal section through an assembled connection constructed in accordance with the invention.
Figure 2:
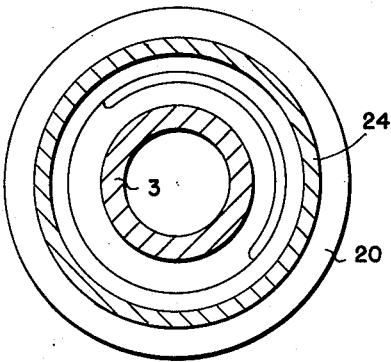
Figure 2 is a radial section through the connector taken on the trace 2—2 of Figure 1.

In Figure 1 there is shown a portion of a pipe 1 which is provided with a portion having increased outer diameter providing a radially outwardly extending compression shoulder 2 and having a portion 3 of reduced outer diameter extending therefrom and terminating in a portion 4 of enlarged cross-sectional area which is externally threaded.

A second pipe 5 is similarly provided with a portion of increased outside diameter providing a radially outwardly extending compression shoulder 6 and having a reduced outer diameter portion 7 extending from the compression shoulder and terminating in a portion 8 of enlarged cross-sectional area provided with external threads.

Positioned between the ends of the portions 4 and 8 of the pipes 1 and 5, respectively, is a tubular member 10 terminating in enlarged end portions 12. As is most clearly shown in Figure 3, the end portions 12 of the tube 10 terminate in generally conically tapered end portions 14. The surfaces of these conical portions are of concave form in longitudinal section. The adjacent ends of the portions 4 and 8 of the pipes 1 and 5, respectively, are provided with a conically formed recess formed to receive the end portions 14 and having surfaces 15 which are of convex form in longitudinal section. While preferably the engaging surfaces are of concave-convex form, the connection is operative if these surfaces are of concave-flat or of flat-flat form. Regardless of the engaging surface forms, these surfaces should be formed with sufficient differential, such as that indicated in Figure 3, so that upon deflection of the end of pipe 10, these engaging surfaces will fully coincide when the connection is fully tightened.

A joining nut indicated generally at 16 includes a cylindrical central portion 18 terminating in portions 20 and 22 having enlarged cross-sectional area and which are internally threaded and which terminate in tubular portions 24 and 26, respectively, of reduced cross-sectional area. The internal threads on the portions 20 and 22 of the joining nut 16 are adapted to engage the external threads on the portions 4 and 8, respectively, of the pipes. The axially outer ends of the end portions 24 and 26 are adapted to engage the compression shoulders 2 and 6, respectively, and to lie in spaced relation with the tube portions 3 and 7, respectively, and the central portion 18 is adapted to lie in spaced relation with the insert tube 10.

The ends of the pipes 1 and 5 are formed with radially extending shoulders 17 and 9, respectively, and the ends of the insert tube are formed with radially extending shoulders 11. The mating conical tapers 13 and 14, and 15 and 14 are so formed that upon assembly of the parts the adjacent tapered surfaces engage before and come into full line contact when the shoulders 17 and 11 and the shoulders 9 and 11 engage each other.

The described portions of the pipes 1 and 5, the insert tube 10, and the locking nut 16 are so proportioned that upon assembly of the parts the ends of the portions 24 and 26 will engage the compression shoulders 2 and 6 at the same time that the shoulders 11 on the ends of the insert tube 10 will engage the shoulders 17 and 9 on the ends of the pipes 1 and 5, respectively.

Figure 1 shows the connection in a fully assembled condition and under load. It will be noted that under this condition shoulders 17 and 9 on the ends of the pipes 1 and 5, respectively, are in engagement with shoulders 11 on the ends of the insert tube 10, and the conical surfaces 14 are in engagement with the conical surfaces 13 and 15 with the conical surfaces 14 being deformed and deflected inwardly by the wedging action due to the connector loading.

The cross-sectional areas of the portions 3, 24, 10, 18, 7 and 26 of the connector are all equal. Each of these areas may be indicated as $A_c$. The cross-sectional areas of the pipes 1 and 5 are equal and may be indicated as $A_p$.

Now if:

$f_n$=that part of the axial force supplied by the joining nut 16 required to bring the shoulders 9 and 11 and the shoulders 17 and 11 together, and $f_p$=the maximum designed for tension load (live plus dead) acting on the pipes 1 and 5 adjacent to the enlarged diameter portions thereof providing the compression shoulders 2 and 6, then the connector is constructed so that the areas $A_c$ and $A_p$ will be defined by the equation $f_p \cdot A_c = (f_n + f_p) \cdot A_p$. Thus, for each load change in the assembled connector, axial unit deformations are designed to be equal at each of the sections having area $A_c$ and the maximum stress in the connection area is designed not to exceed the maximum stress, in terms of unit stress or force per unit area, which may be encountered in the pipes 1 and 5 under loading.

The lengths of the portions 3 and 24 and of the portions 7 and 26 of the connector are equal to one another and equal to one-half the length of the reduced diameter portion of the insert tube 10 and of the portion 18 of the locking nut when the nut is fully tightened so as to have its portion 18 under axial tension equal to $f_n + \frac{1}{2} f_p$. Thus in the free state with the parts unloaded, the length of each of the portions 24 and 26 of the locking nut is longer than the length of each of the portions 3 and 7 of the pipes by twice the axial deformation of one of these portions when under a loading equal to $f_n + \frac{1}{2} f_p$.

The length of the portion 18 of the locking nut is designed to be twice the length of the portions 3 and 7 of the pipes while in a free state. The length of the reduced diameter portion of the insert tube 10 is designed to be, in a free state, equal to the length of the portion 18 of the locking nut plus twice the axial deformation of the portion 18 when under a loading equal to $f_n + \frac{1}{2} f_p$.

As previously mentioned, in the tightened connection the portion 18 of the joining nut is under tension and the insert tube 10 is under compression, and the portions 24 and 26 of the joining nut are under compression and the portions 3 and 7 of the pipes are under tension. These portions provide elastic extensions from the threaded portions 20 and 4, and 22 and 8 and their stresses are balanced. The total final tightening load supplied by the joining nut, as measured by the tension in the portion 18 of the joining nut, must be at least equal to the sum of the force $f_n$, which is the sealing load, and one-half the maximum designed for external tension load $f_p$. The load $f_p$ is calculated as the sum of the theoretical externally applied live plus dead axial loadings on the pipes plus the theoretical axial tensional component force resulting from pressures in the materials contained within the pipes and the insert tube 10, when such sum is enough larger than the actual maximum to-be-encountered total pipe axial loadings, that the pipe safety factor has reached or has measurably approached zero. By thusly designing the connection structure for loads somewhat in excess of those loads actually to be encountered, the engaging and the sealing surfaces of the connection will remain securely loaded for all operating variations of loads on the joined members.

While actual values of the various lengths and cross-sectional areas of the conector portions described must be selected for specific values of $f_n$ and $f_p$ to be encountered, the above defined relative lengths and areas of these portions serve to effectively float the pairs of mating threaded members 4, 20 and 8, 22 serving to materially reduce the load fluctuations at the root sections of the threaded members. The structure also serves to maintain substantially constant loadings at the thread faces (or other holding surface forms) over wide fluctuations of axial tension and compression forces transmitted between the pipes 1 and 5 through the connector assembly.

It should be noted that the shoulder-limited radial-deflections of the tapered sealing surfaces provide substantially constant loadings at the pairs of mating sealing surfaces 14, 15 and 14, 13 over wide fluctuations of axial tension and compression forces transmitted between pipes 1 and 5 through the connector assembly.

More specifically, increasing tension forces in the pipes 1 and 5 will decrease the joining nut loading against the compression shoulders 2 and 6 while the change in thread loadings between the members 4 and 20 and between the members 8 and 22 will be relatively small. Compression forces in the pipes 1 and 5 will increase, though only moderately, the nut loading against the compression shoulders 2 and 6 while the change in thread loadings will again be relatively small. Thus the elastic members in the connection, each of which has the same spring constant, will serve to reduce the stress fluctuations at the threads in the connector when the connector is subjected to dynamic loadings in the axial direction. The sealing loads at the curved sealing surfaces 14 remain substantially constant for all variations of load transmitted through the connector.

In addition to the foregoing, the connector provides not only for materially reduced load fluctuations over the threaded length of each of the pairs of threaded connections thus avoiding fatigue failures at the end threads of each of the groups, but also provides for the division of load fluctuations, half being transmitted through the portions 3, 10 and 7 and the other half being transmitted through portions 24, 18 and 26 of the connector. Thus the load fluctuations at the end threads of the connector are halved and, therefore, the connector is capable of handling substantially higher loads than connectors heretofore employed having similarly dimensioned threaded connections.

Figure 4:
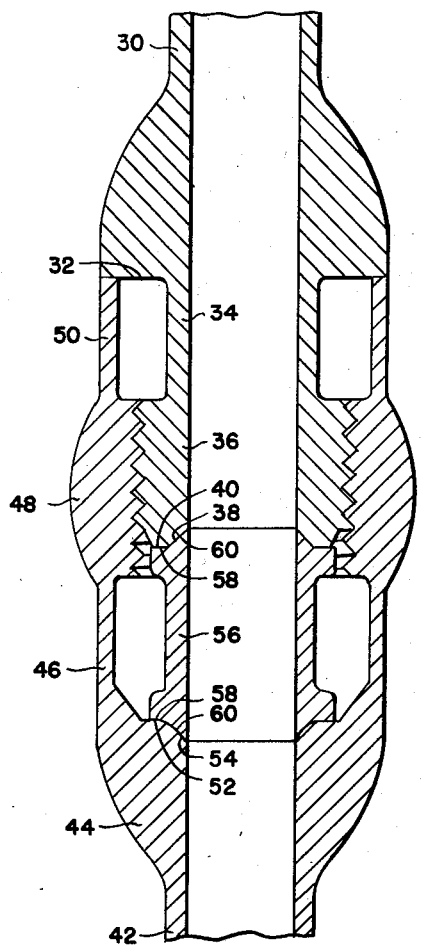
Figure 4 is a longitudinal section through a modified form of the invention.

In Figure 4 there is shown a modified form of the invention in which a pipe 30 has its end portion formed with an enlarged diameter portion providing a radially outwardly extending compression shoulder 32 having a cylindrical portion 34 extending therefrom and terminating in an enlarged diameter portion 36 provided with external threads.

A second pipe 42 is provided with an enlarged diameter portion 44 connecting with a cylindrical portion 46 which connects with an enlarged diameter portion 48 which is internally threaded and terminates in a second cylindrical portion 50. The internal threads of the portion 48 are adapted to mesh with the external threads of the portion 36 of the pipe 30.

An insert tube 56 is positioned between the portion 36 of the pipe 30 and the portion 44 of the pipe 42. The insert 56 is provided with radial shoulders 58 adapted to engage the mating shoulders 40 and 52 in the pipes 30 and 42, respectively. The insert tube is also provided with tapered portions 60 of conical form having concavely curved outer surfaces which engage convex conical recessed surfaces 38 and 54 in the portions 36 and 44 of the two pipes. It will be evident that this compresison sealing connection is identical with that described in connection with the portion of the previously described embodiment of the invention shown in Figure 3.

In this embodiment of the invention the joining nut is omitted and the adjacent ends of the two pipes are dissimilarly formed so as to provide an elastic connector embodying the principles discussed in connection with the form of connector shown in Figure 1. In this embodiment of the invention there is preserved the characteristics of uniform loading at the sealing surfaces 60, 54 and 38, 60 as well as the uniformity of loading over the entire length of the threads on each of the pairs of mating threaded surfaces.

In this form of the invention the cylindrical portion 50 of the pipe 42 and the insert tube 56 are in compression and the cylindrical portion 34 of the pipe 30 and the cylindrical portion 46 of the pipe 42 are in tension. The cross-sectional area of each of these compression and tension portions is the same and the portions 50 and 46 of the pipe 42 are equal in length and equal to the length of the portion 34 of the pipe 30 and to the length of the reduced diameter portion of the insert tube 56 when the connection is fully tightened as shown in Figure 4. The method of determining the non-loaded dimensions of these various portions is precisely the same as that described in connection with the embodiment of the invention shown in Figure 1.

Figure 3:
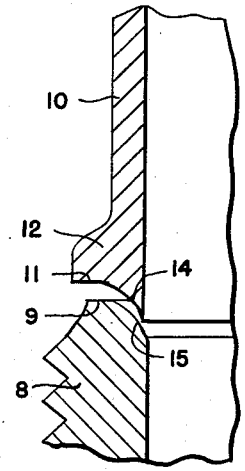
Figure 3 is an enlarged fragmentary portion of the connector shown in Figure 1 with the connector in a partially disassembled condition.
Figure 5:
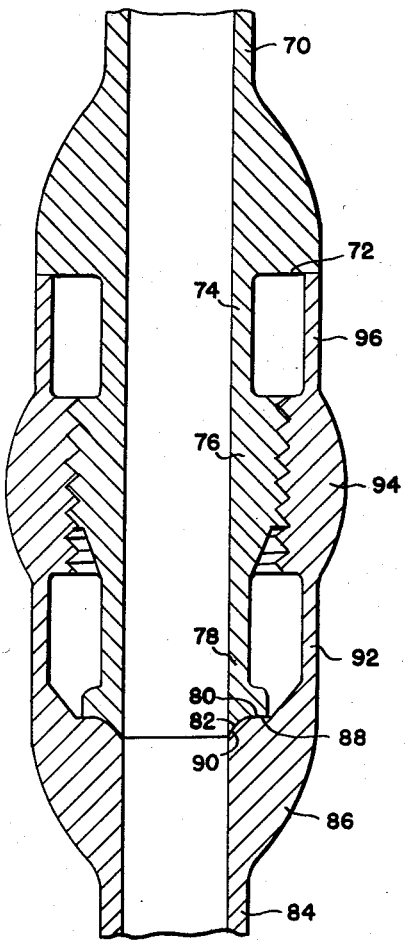
Figure 5 is a longitudinal section through still another modification of the invention.

In a further modification of the invention as shown in Figure 5, there is provided on the end of the pipe 70 an enlarged diameter portion providing a shoulder 72 and connecting with a cylindrical portion 74 which connects with an enlarged diameter threaded portion 76 terminating in a cylindrical portion 78 having its end formed with a radially extending shoulder 80 and a conically tapered end 82 having a concave surface similar to that described in connection with the part shown in Figure 3.

A second pipe 84 is provided with an enlarged diameter portion 86 provided with a shoulder 88 adapted to engage the shoulder 80 and a convex conically formed recess 90 adapted to engage the concave conical end portion 82 of the pipe 70. The portion 86 of the pipe 84 joins with a cylindrical portion 92 which joins with an enlarged diameter portion 94 which is internally threaded with threads adapted to mesh with the threads on the portion 76 and which terminates in a cylindrical portion 96 having a radial plane and adapted to engage the compression shoulder 72 on the pipe 70.

This form of the invention is substantially identical to that described in connection with Figure 4, the distinction being that in this form of the invention a separate deformation insert is not employed, this deformation member being provided as an integral part of the pipe 70.

While the constantly loaded sealing surfaces at the end of the insert tube or between the ends of the two pipes, as shown in Figure 5, are desirably employed, they may be omitted and various other types of sealing surfaces may be employed without altering the improved loading characteristics of the thread faces or other holding surface forms and of the thread root sections, of this connection structure. Thus in place of the constantly loaded tapered sealing surfaces there may, if desired, be employed a sealing connection in the form of conventional packing material. It is believed that this modification is obvious and need not be described further. The invention may also be employed with tapered threads of the type generally employed in pipe couplings where quick connection and disconnection is desired.

Figures 6, 7:
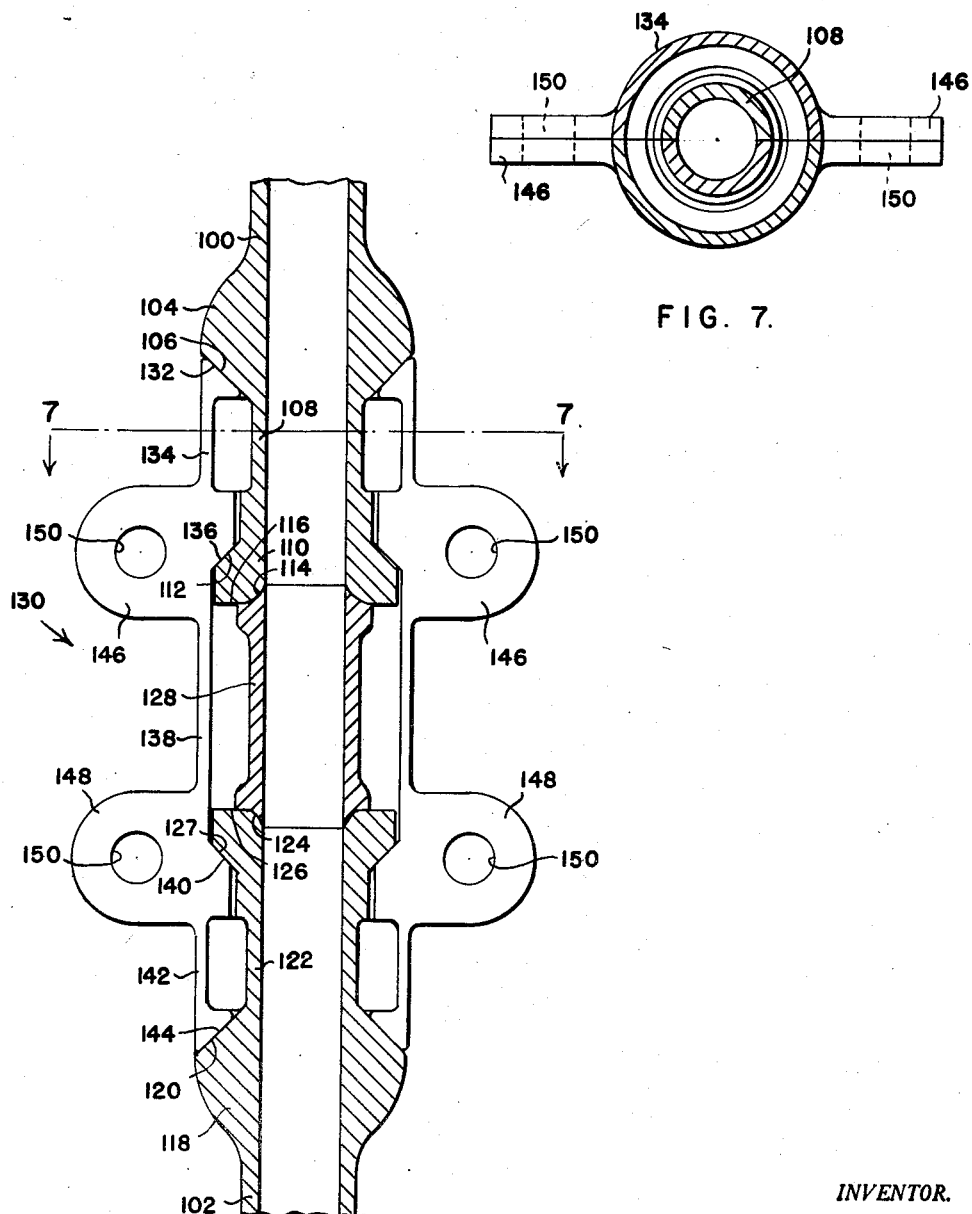
Figure 6 is a longitudinal section through still another modification of the invention.
Figure 7 is a radial section taken on the trace 7—7 through the connector shown in Figure 6.

The modification shown in Figures 6 and 7 employs a split clamp as a holding means rather than the threaded interengaging surfaces shown in the Figures 1, 4 and 5. In the arrangement shown in Figures 6 and 7, pipes 100 and 102 are connected together. The pipe 100 is provided with an enlarged diameter portion 104 formed with a conical surface 106 which terminates in a reduced cross-sectional area portion 108 which, as will be described, provides a tension section similar to the portion 3 described in connection with Figure 1. The portion 108 terminates in an enlarged diameter portion 110 which is formed with a conical surface 112 extending inwardly at a distance spaced from the end of the tube and is formed with surfaces 114 and 116 corresponding to surfaces 13 and 17 described in connection with Figure 1.

The pipe 102 is provided with an enlarged diameter portion 118 having a conical surface 120 terminating in a reduced cross-sectional area portion 122. At the outer end of the portion 122 the diameter of the pipe is increased and the pipe is formed with a conical surface 127 and end surfaces 124 and 126. The conical surfaces 120 and 127 correspond to the surfaces 106 and 112 previously described and the surfaces 124 and 126 correspond to the surfaces 114 and 116, respectively, previously described.

A compression member 128 is positioned between the ends of the two pipes and may be identical to the compression member 10 described in connection with Figure 1.

In place of the threaded connection described in connection with Figure 1, in the arrangement shown in Figures 6 and 7 a split clamp indicated generally at 130 is employed. The ends of the split clamp are provided with conically formed recessed surfaces 132 and 144 adapted to mate with the surfaces 106 and 120, respectively. Positioned inwardly of the end portions of the split clamp are reduced cross-sectional area portions 134 and 142 positioned adjacent to the portions 108 and 122, respectively, of the pipes. The portions 134 and 142 have cross-sectional areas identical to those of the portions 108 and 122 of the pipes and provide compression members similar to the compression members 24 and 26 described in connection with Figure 1.

Inwardly of the portions 134 and 142 the split clamps are provided with outwardly extending ears 146 and 148, respectively, containing bolt holes 150 through which suitable bolts may be passed for joining the split clamps together. In the region of the ears 146 the clamps are provided with conical recessed surfaces 136 and in the region of the ears 148 the clamps are provided with conical recessed surfaces 140 adapted to engage the conical surfaces 112 and 127, respectively, on the pipes. Extending between the ears 146 and 148 of the split clamp is a reduced cross-sectional area portion 138 which is coextensive with the compression member forming portion of the compression member 128 and forming a tension member similar to the tension member 18 described in connection with Figure 1.

From the foregoing it will be evident that in the arrangement described in connection with Figures 6 and 7 the split clamps provide connection of the pipes and the compression member 128 in substantially the same manner as do the threads shown in Figure 1. The mating conically formed surfaces transmit the loading between the elements and the compression members 134, 128 and 142, and the tension members 108, 138 and 122 act in a manner identical to the corresponding compression and tension members shown in Figure 1.

It is believed evident from the foregoing that the invention is not limited to threaded connections but that either threaded or various other types of connections such as, for example, the split clamp type of connection, may be employed and that these and other modifications may be made to the embodiments of the invention disclosed herein without departing from the scope of the invention as set forth in the following claims.

What is claimed is:

1. A connection structure for joining a pair of tubular members in longitudinal alignment comprising means including substantially rigid sections extending from adjacent longitudinal ends of said members and formed with holding surfaces for joining said members together, means forming relatively elastic deformation tension sections extending between said rigid sections and the members from which they extend, and means forming relatively elastic deformation compression sections acting between said rigid sections and said members, said elastic deformation sections all being of substantially equal length and transverse cross-sectional area, and of lesser transverse cross-sectional area than said rigid sections and the portions of said members from which said elastic deformation tension sections extend, said elastic deformation sections being formed to provide balanced loading longitudinally and transversely within said sections, one of said elastic deformation compression sections being in abutting relation with one of said tubular members over substantially radial plane surfaces and with its inner wall forming substantially a continuation of the inner walls of said tubular members, the abutting surfaces also being formed with a portion of one of said surfaces having a tapered extension and a portion of the abutting surface having a tapered recess adapted to receive said tapered extension, and at least one of said tapers having a convex surface to provide for deformation of said tapered extension when said radial plane surfaces are in engagement with each other.

2. A connection structure for joining a pair of cylindrical members in longitudinal alignment comprising means including substantially rigid cylindrical sections extending from adjacent longitudinal ends of said members and formed with holding surfaces for joining said members together, a cylindrical relatively elastic deformation tension section extending between each of said cylindrical sections and the member from which it extends, a cylindrical relatively elastic deformation compression section acting between said holding surfaces and each member, said elastic deformation sections all being of substantially equal length and transverse cross-sectional area, and of lesser transverse cross-sectional area than said cylindrical sections and the portions of said members from which said tension sections extend, said elastic sections being formed to provide balanced loading longitudinally and transversely within said sections, and joining means extending between said cylindrical members and formed with holding surfaces engaging said cylindrical section holding surfaces, said joining means being formed with a cylindrical elastic deformation tension section between the portions thereof formed with holding surfaces, and a cylindrical elastic deformation compression section acting between said cylindrical sections, said last mentioned elastic deformation tension and compression sections each having substantially twice the length and substantially the same transverse cross-sectional area as said first mentioned transverse sections.

3. A connection structure for joining a pair of cylindrical members in longitudinal alignment comprising means including substantially rigid cylindrical sections extending from adjacent longitudinal ends of said members and formed with holding surfaces for joining said members together, a cylindrical relatively elastic deformation tension section extending between each of said cylindrical sections and the member from which it extends, a cylindrical relatively elastic deformation compression section acting between said holding surfaces and each member, said elastic deformation sections all being of substantially equal length and transverse cross-sectional area, and of lesser transverse cross-sectional area than said cylindrical sections and the portions of said members from which said tension sections extend, said elastic sections being formed to provide balanced loading longitudinally and transversely within said sections, and joining means extending between said cylindrical members and formed with holding surfaces engaging said cylindrical section holding surfaces, said joining means being formed with a cylindrical elastic deformation tension section between the portions thereof formed with holding surfaces, and a separate cylindrical elastic deformation compression section acting between said cylindrical sections and having its ends in abutting relation with said members, said last mentioned elastic deformation tension and compression sections each having substantially twice the length and substantially the same transverse cross-sectional area as said first mentioned transverse sections.

4. A connection structure for joining a pair of cylindrical members in longitudinal alignment comprising means including substantially rigid cylindrical sections extending from adjacent longitudinal ends of said members and formed with holding surfaces for joining said members together, a cylindrical relatively elastic deformation tension section extending between each of said cylindrical sections and the member from which it extends, a cylindrical relatively elastic deformation compression section acting between said holding surfaces and each member, said elastic deformation sections all being of substantially equal length and transverse cross-sectional area, and of lesser transverse cross-sectional area than said cylindrical sections and the portions of said members from which said tension sections extend, said elastic sections being formed to provide balanced loading longitudinally and transversely within said sections, and joining means extending between said cylindrical members and formed with holding surfaces engaging said cylindrical section holding surfaces, said joining means being formed with a cylindrical elastic deformation tension section between the portions thereof formed with holding surfaces, and a separate cylindrical elastic deformation compression section acting between said cylindrical sections and having its ends in abutting relation with said members over substantially radial plane surfaces and with its inner wall forming substantially a continuation of the inner walls of said cylindrical members, the abutting surfaces also being formed with a portion of one of said surfaces having a tapered extension and a portion of the abutting surface having a tapered recess adapted to receive said tapered extension, and at least one of said tapers having a convex surface to provide for deformation of said tapered extension when said plane surfaces are in engagement with each other.

5. A connection structure for joining a pair of members and for transmitting loading therebetween including a pair of concentrically arranged substantially rigid elements having inclined engaging surfaces for drawing said members together, axially centered cylindrical relatively elastic extensions extending from each end of each of the elements, the cross-sectional area of the elastic extensions extending from each end of each of the elements being approximately equal, and means for connecting said extensions to adjacent ends of a pair of members to be joined for the transfer of axial loading therebetween with the inner extension from one end of the elements and the outer extension from the other end of the elements being in compression and with the outer extension from said one end of the elements and the inner extension from said other end of the elements being in tension.

6. A connection structure for joining a pair of tubular members and for transmitting loading therebetween including a pair of annularly arranged substantially rigid elements having inclined engaging surfaces for drawing said members together, relatively elastic extensions extending from each end of each of the elements, means for connecting said extensions to adjacent ends of a pair of members to be joined for the transfer of axial loading therebetween with the inner extension from one end of the elements and the outer extension from the other end of the elements being in compression and with the outer extension from said one end of the elements and the inner extension from said other end of the elements being in tension, and one end of the inner compression extension being provided with a compression shoulder for engagement with its adjacent member, said end of the inner compression extension being provided with a tapered extension and said adjacent member being provided with a tapered recess adapted to receive said tapered extension, and at least one of said tapers having a convex surface to provide for deformation of said tapered extension when said compression shoulder is in engagement with said adjacent member.

7. A connection structure for joining a pair of members and for transmitting loading therebetween including a pair of concentrically arranged substantially rigid elements having inclined engaging surfaces for drawing said members together, axially centered cylindrical relatively elastic extensions extending from each end of each of the elements, the cross-sectional area of the elastic extensions extending from each end of each of the elements being approximately equal, and means for connecting said extensions to adjacent ends of a pair of members to be joined for the transfer of axial loading therebetween with the inner extension from one end of the elements and the outer extension from the other end of the elements being in compression and with the outer extension from said one end of the elements and the inner extension from said other end of the elements being in tension, the inner compression extension being a part separate from either of the members being joined together.

(References on following page)

References Cited in the file of this patent

UNITED STATES PATENTS

| | | |
|---|---|---|
| 382,920 | Westinghouse | May 15, 1888 |
| 1,218,359 | Beatty | Mar. 6, 1917 |
| 1,812,553 | Redfield | June 30, 1931 |
| 1,849,510 | Thomson | Mar. 15, 1932 |
| 1,889,868 | Montgomery | Dec. 6, 1932 |
| 2,045,520 | Davison | June 23, 1936 |
| 2,258,066 | Oyen | Oct. 7, 1941 |
| 2,320,107 | Speckert | May 25, 1943 |
| 2,508,306 | Thurston | May 16, 1950 |
| 2,574,081 | Abegg | Nov. 6, 1951 |

FOREIGN PATENTS

| | | |
|---|---|---|
| 676,897 | Great Britain | Aug. 6, 1952 |